United States Patent
Sato et al.

(10) Patent No.: US 6,663,804 B2
(45) Date of Patent: Dec. 16, 2003

(54) METHOD AND APPARATUS FOR CONTROLLING INJECTION MOLDING MACHINE CAPABLE OF REDUCING VARIATIONS IN WEIGHT OF MOLDED PRODUCTS

(75) Inventors: Hiroshi Sato, Chiba (JP); Hiroyoshi Suumen, Sakura (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 355 days.

(21) Appl. No.: 09/745,417

(22) Filed: Dec. 26, 2000

(65) Prior Publication Data

US 2001/0020753 A1 Sep. 13, 2001

(30) Foreign Application Priority Data

Mar. 13, 2000 (JP) ........................................ 2000/068037
Mar. 27, 2000 (JP) ........................................ 2000/086025

(51) Int. Cl.[7] .............................................. B29C 45/77
(52) U.S. Cl. ........................ 264/40.5; 425/145; 425/149
(58) Field of Search ................... 264/40.5; 425/145–149

(56) References Cited

U.S. PATENT DOCUMENTS 4,120,631 A * 10/1978 Leutner et al. ............. 425/145
4,863,651 A * 9/1989 Koten ....................... 264/40.5
5,062,785 A * 11/1991 Stroud et al. ............... 425/145
5,362,222 A * 11/1994 Faig et al. .................. 425/145
5,733,486 A * 3/1998 Hayasi et al. ............... 264/40.1
6,108,587 A * 8/2000 Shearer et al. .............. 700/200

FOREIGN PATENT DOCUMENTS

JP  10-146874  * 6/1998
WO  WO 90/09879    9/1990

OTHER PUBLICATIONS

Patent Abstract of Japanese Publication No. 10 146874, Published Jun. 1998.

* cited by examiner

Primary Examiner—Jill L. Heitbrink
(74) Attorney, Agent, or Firm—Squire, Sanders, & Dempsey L.L.P.

(57) ABSTRACT

A nozzle internal resin pressure feedback control system has a mold internal pressure sensor for measuring a mold internal resin pressure as a measured mold internal pressure value. The measured mold internal pressure value is fed to the nozzle internal resin pressure feedback control system, and a nozzle internal pressure preset value in the nozzle internal resin pressure feedback control system is changed in accordance with a difference between the measured mold internal pressure value and the mold internal pressure preset value.

14 Claims, 5 Drawing Sheets

METHOD AND APPARATUS FOR CONTROLLING INJECTION MOLDING MACHINE CAPABLE OF REDUCING VARIATIONS IN WEIGHT OF MOLDED PRODUCTS

BACKGROUND OF THE INVENTION

The present invention relates to a method and an apparatus for controlling an injection molding machine. In particular, this invention relates to a method and an apparatus for controlling mold internal pressure in order to reduce variations in weight of molded products.

Referring to FIG. 1, a motor-driven injection molding machine will be described focusing on an injection unit. The motor-driven injection molding machine has the injection unit which is driven by a servomotor. In such an injection unit, rotation of the servomotor is converted into linear motion by a ball screw and a nut, thereby moving a screw forward and backward.

In FIG. 1, the rotation of an injection servomotor 11 is transmitted to a ball screw 12. A nut 13 is fixed on a pressure plate 14 and is moved forward and backward by rotation of the ball screw 12. The pressure plate 14 is movable along four guide bars 15 and 16 (only two are shown in the figure) fixed on a base frame (not shown). Forward and backward motion of the pressure plate 14 is transmitted to a screw 20 via a bearing 17, a load cell 18, and an injection shaft 19. The screw 20 is rotatably and axially movably disposed in a heating cylinder 21. The heating cylinder 21 includes a hopper 22 for feeding a resin to a position corresponding to the rear portion of the screw 20. Rotating motion of a servomotor 24 for rotating the screw 20 is transmitted to the injection shaft 19 via a connecting member 23 which may be a belt, pulleys, etc. In other words, the servomotor 24 rotates the injection shaft 19 which in turn rotates the screw 20.

In a plasticizing/measuring process, the screw 20 rotates and moves backward in the heating cylinder 21 so that a molten resin is stored in front of the screw 20, that is, in the heating cylinder 21 on the side of a nozzle 21-1. The backward movement of the screw 20 is caused by pressure due to gradual increase in the amount of molten resin stored in front of the screw 20.

In a filling and injecting process, the forward movement of the screw 20 in the heating cylinder 21 is caused by a driving force from the injection servomotor 11, so that the molten resin stored in front of the screw 20 is forced into and is pressurized in a metal mold. In this case, the force for pressing the molten resin is measured by the load cell 18 as an injection pressure. The measured injection pressure is amplified by a load cell amplifier 25 and is fed into a controller 26. The pressure plate 14 has a position detector 27 for measuring the amount of movement of the screw 20. The measuring signal outputted from the position detector 27 is amplified by a position detector amplifier 28 and is fed into the controller 26.

The controller 26 outputs current (torque) instruction values corresponding to the respective processes and based on some values preset by a display/setting unit 33 via a man-machine controller 34. The current instruction values are fed to a drive 29 and a drive 30. The drive 29 controls a current for driving the servomotor 11 to control an output torque of the servomotor 11. The drive 30 controls a current for driving the servomotor 24 to control the number of revolutions of the servomotor 24. The servomotor 11 and the servomotor 24 comprise encoders 31 and 32, respectively, for measuring the number of revolutions. The number of revolutions detected by the encoders 31 and 32 are fed to the controller 26. In particular, the number of revolutions detected by the encoder 32 is used to determine the number of revolutions of the screw 20.

If an injection molding machine is a hydraulic injection molding machine, a hydraulic injection cylinder may be used to replace the conversion system for converting a rotary movement into a linear movement, which is effected by means of the ball screw and the nut involved in the injection apparatus. In this case, the oil pressure within the injection cylinder is measured. Since the construction of the hydraulic injection molding machine is already well known in the art, it will not be illustrated and described in this specification.

However, one subject associated with the above-described injection molding machine is to manufacture, in a shortened time period and at reduced production cost, a large number of molded products of uniform quality. Here, one factor that has an influence on the quality of the molded products is their weights.

In order to manufacture molded products of uniform weight, there has been suggested a mold internal pressure feedback control system. In this mold internal pressure feedback control system, a mold internal pressure sensor is provided in the metal mold for measuring resin pressure in the metal mold. In this way, the injection servomotor or oil pressure in the hydraulic injection cylinder may be controlled in accordance with a difference between a mold internal pressure measured by the mold internal pressure sensor and a preset value of the mold internal pressure given as a target value, with the control itself being effected by reducing the difference to zero.

FIG. 2 is a block diagram showing the above-mentioned mold internal pressure feedback control system.

However, the mold internal pressure feedback control system shown in FIG. 2 has been found to have the following problems. That is, it is difficult to stabilize the pressure within the metal mold, merely by measuring the pressure variations within the metal mold since there are some limits to the response time of the overall control system. As a result, it is difficult to stabilize the mold internal pressure, hence making it difficult to manufacture molded products of uniform weight.

On the other hand, as discussed above, the mold internal pressure has a significant influence on the quality of the molded products, especially on the weights thereof. In view of this, there have been suggested some other control methods for stabilizing the mold internal pressure, which methods are different from that shown in FIG. 2. For example, a method has been suggested which requires that a mold internal pressure control system be connected in cascade with an injection pressure control system, a preset value of the mold internal pressure and a measured value of the same are compared with each other, so that a preset value of an injection pressure may be changed so as to adjust the injection pressure.

In the use of the above method, it is necessary that the injection pressure and the mold internal pressure be set at the same time when setting operation conditions. However, since the response of the mold internal pressure has an extremely large time lag in the injection pressure feedback system, it is not easy to adjust the injection pressure, nor is it easy to set the mold internal pressure, hence making it difficult to set operation conditions.

In fact, the mold internal pressure often changes in the manner shown in FIG. 3. In order to obtain molded products of a good quality, it is necessary that the mold internal pressure be set so that it can change in accordance with the graph shown in FIG. 3. This, however, makes it more difficult to set operation conditions.

SUMMARY OF THE INVENTION

Accordingly, it is an object of the present invention to provide a control method for controlling an injection molding machine, which is effective for producing molded products of a uniform weight.

Furthermore, another object of the present invention is to provide a control apparatus for controlling an injection molding machine, which is capable of stabilizing a mold internal pressure by an easy operation.

The control method of the present invention is suitable for use in an injection molding machine including a mold internal pressure sensor for measuring a mold internal resin pressure as a measured mold internal pressure value. The measured mold internal pressure value is fed to a nozzle internal resin pressure feedback control system. A nozzle internal pressure preset value in the nozzle internal resin pressure feedback control system is changed in accordance with a difference between the measured mold internal pressure value and an mold internal pressure preset value.

The control apparatus of the present invention is suitable for use in an injection molding machine which comprises a mold internal pressure sensor for measuring resin pressure within a metal mold cavity or within a resin flow passage extending to the cavity, a pressure sensor for detecting injection and dwell pressures, and injection and dwell pressure setting section, and a mold internal pressure setting section. The mold internal pressure setting section includes a memory. With respect to an injection and dwell pressure preset value fed from the injection and dwell pressure selling section, a detected value from the pressure sensor is fed back so as to set operation conditions. A pattern detected by the mold internal pressure sensor obtained when a molded product of a good quality was produced, is stored as the mold internal pressure present value in the memory. In an actual molding process, a detected value from the pressure sensor is fed back, and a difference is also fed back between the mold internal pressure preset value stored in the memory and a measured value fed from the mold internal pressure sensor, thereby adjusting an injection and dwell pressure preset value fed from the injection and dwell pressure setting section. In this way, an injection and dwell pressure feedback loop is used to perform a mold internal pressure feedback, thereby regulating an instruction value for injection and dwell.

DESCRIPTION OF THE PREFERRED EMBODIMENTS

Figure 4:
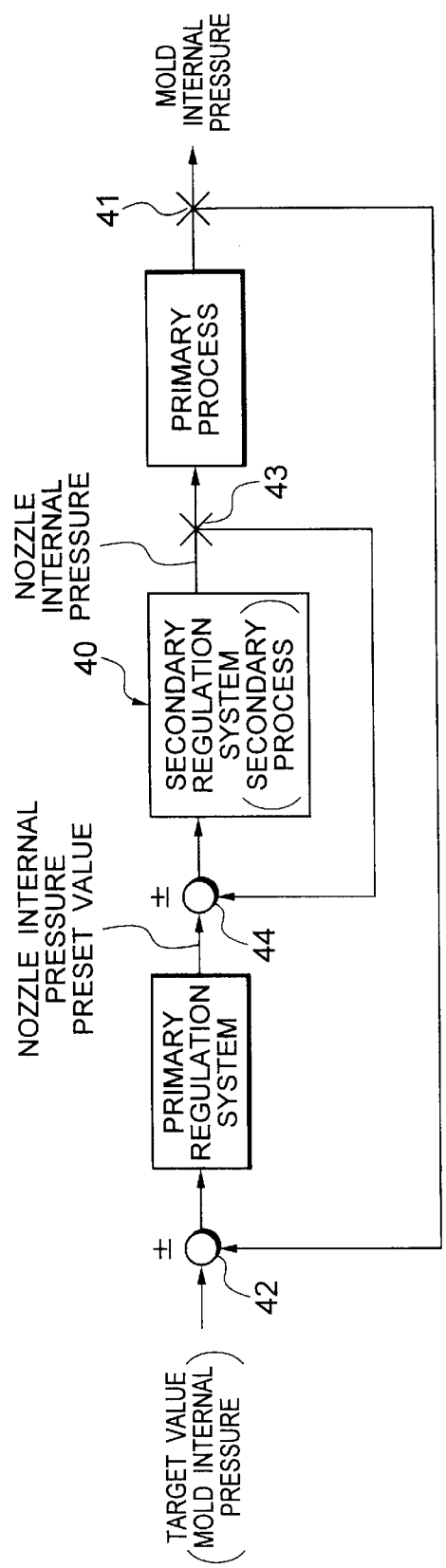
FIG. 4 is a block diagram showing a control apparatus according to a first embodiment of the present invention.

With reference to FIG. 4, a control method will be described which is for controlling an injection molding machine according to a first embodiment of the present invention. FIG. 4 is a block diagram showing a control system for carrying out the present invention. In FIG. 4, the control system comprises a mold internal pressure sensor 41 for measuring the pressure of resin injected in a metal mold. A mold internal pressure value measured by the mold internal pressure sensor 41 is fed to a nozzle internal resin pressure feedback control system 40. In the control system, a difference between a measured mold internal pressure value (measured by the mold internal pressure sensor 41) and a mold internal pressure target value is calculated by a subtracter 42. A main control system is provided to change, in accordance with the calculated difference, a nozzle internal pressure preset value in the nozzle internal resin pressure feedback control system 40.

The nozzle internal resin pressure feedback control system 40 includes a nozzle internal pressure sensor 43 for measuring the nozzle internal resin pressure and outputting a measured nozzle internal pressure value, and a subtracter 44 for calculating a difference between the nozzle internal pressure preset value changed by the above main control system and a measured nozzle internal pressure value. In this way, the injection pressure can be controlled in accordance with the difference calculated by the subtracter 44.

The control system according to the present embodiment is not a system for directly feeding back a measured mold internal pressure value. Instead, it is a system for changing a preset value of the nozzle internal resin pressure feedback control system 40, in accordance with a measured mold internal pressure value. That is, the control system according to the present embodiment can be called a cascade control. Of course, the fundamental portion of the control system is a conventional nozzle internal resin pressure feedback control. However, the gain of the overall control system has been increased, and thus its response characteristic has been improved, by changing the preset value of the nozzle internal resin pressure feedback control system 40 in accordance with a measured mold internal pressure value. In other words, since the nozzle internal pressure sensor 43 is located at a position closer to an injection device than the mold internal pressure sensor 41, and since a measured nozzle internal pressure value from the nozzle internal pressure sensor 43 is used, it is possible for a measured nozzle internal pressure value to be more quickly responsive to the operation of the injection device.

Therefore, with the use of the control system according to the present embodiment, since the mold internal pressure can be maintained constant, it is possible to manufacture molded products of a uniform weight.

Figure 1:
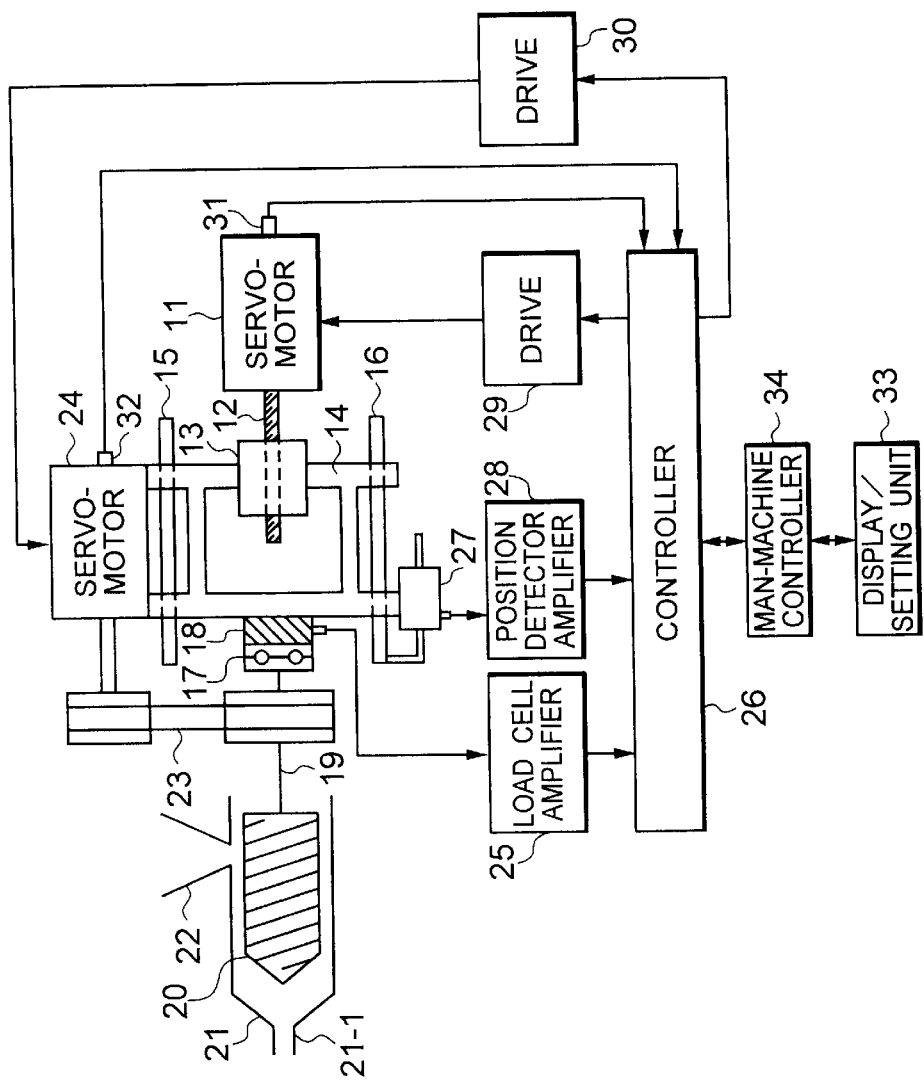
FIG. 1 is an explanatory block diagram showing the construction of a motor-driven injection molding machine which is one example of an injection molding machine.
Figure 2:
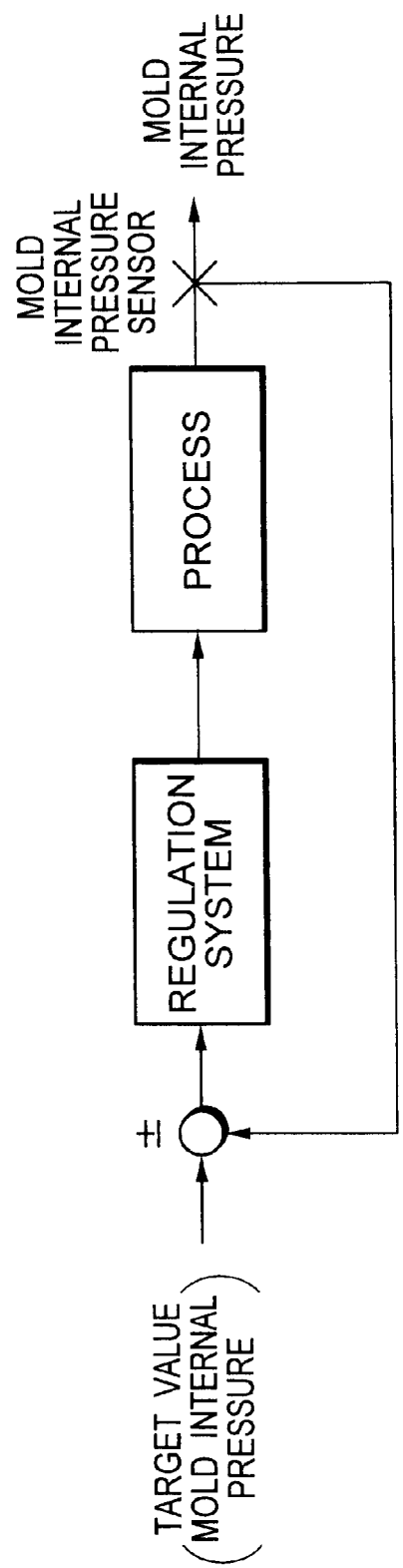
FIG. 2 is a block diagram showing a conventional mold internal pressure feedback control system.

If an injection molding machine is a motor-driven injection molding machine as shown in FIG. 1, a control process can be carried out in the following manner. That is, the nozzle internal resin pressure feedback control system 40 is caused to perform control to make the difference between a nozzle internal pressure preset value (to be changed in accordance with the difference calculated by the subtracter 42) and the measured nozzle internal pressure value (detected by the nozzle internal pressure sensor 43) zero. Specifically, the position of the screw 20 which is driven by the injection servomotor 11, i.e. the injection pressure, will be controlled in accordance with the above difference.

On the other hand, when an injection molding machine is a hydraulic injection molding machine, the control process can be carried out in the following manner. That is, the nozzle internal resin pressure feedback control system 40 is caused to perform control to make the difference between the nozzle internal pressure preset value (to be changed in accordance with the difference calculated by the subtracter 42) and the measured nozzle internal pressure value (detected by the nozzle internal pressure sensor 43) zero. Specifically, the oil pressure of the hydraulic injection cylinder will be controlled in accordance with the above difference.

In this way, with the use of the first embodiment of the present invention, the mold internal pressure can be maintained constant so that the weights of molded products can be made uniform, thereby ensuring improvement in the quality of molded products.

Figure 5:
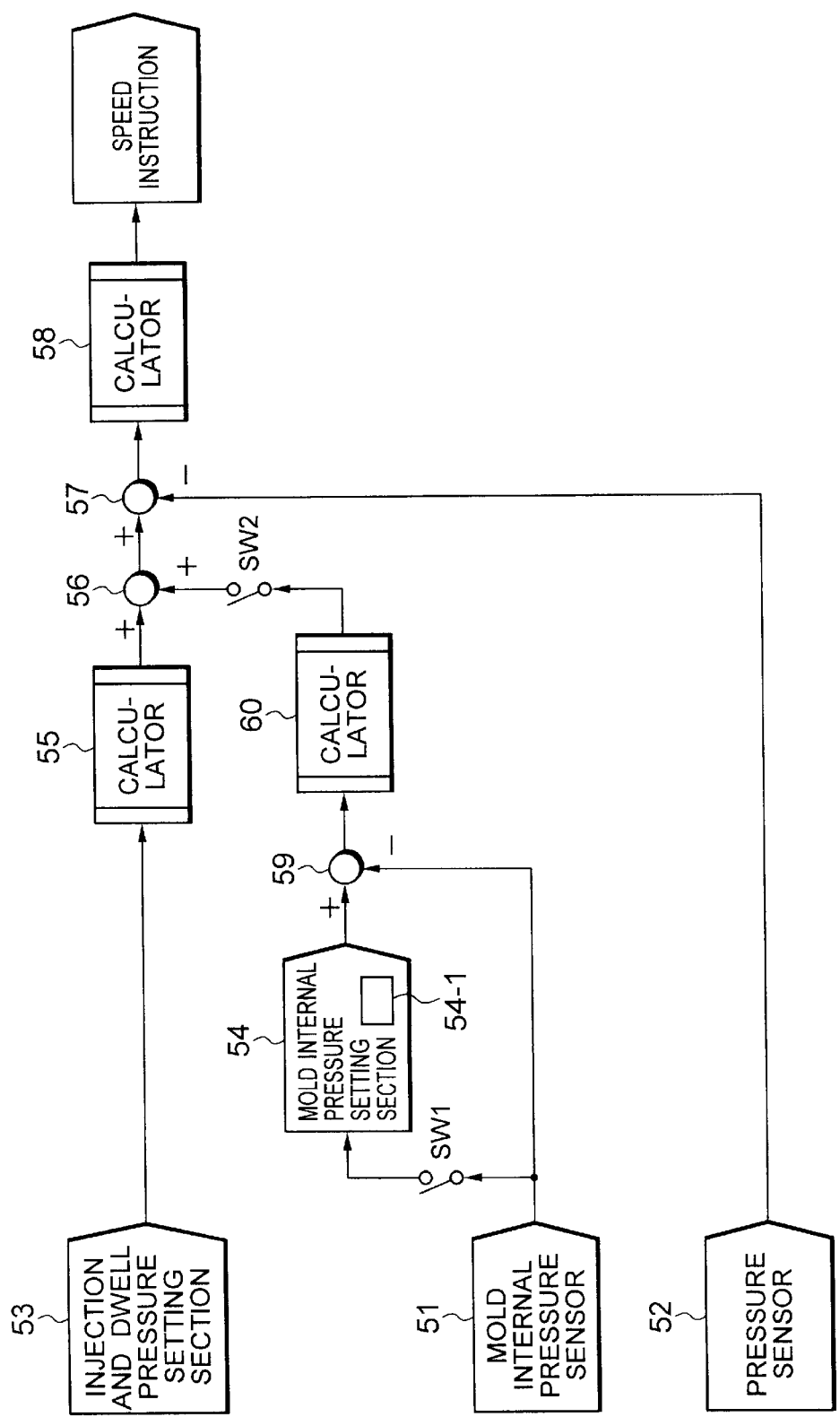
FIG. 5 is a block diagram showing the construction of a control apparatus according to a second embodiment of the present invention.

With reference to FIG. 5, a control apparatus formed according to a second embodiment of the present invention will be described. The control apparatus is suitable for use in an injection and dwell process which is one of several processes for an injection molding process. In fact, an object to be controlled by the control apparatus of the present embodiment is the injection servomotor (represented by a reference numeral 11 in FIG. 1) if the injection molding machine is a motor-driven injection molding machine.

In FIG. 5, the control apparatus according to the present embodiment includes an mold internal pressure sensor 51 for measuring a resin pressure within a metal mold cavity or a resin pressure within a resin flow passage extending to the cavity, a pressure sensor 52 for measuring injection and dwell pressure, an injection and dwell pressure setting section 53, and a mold internal pressure setting section 54.

A preset pressure value for injection and dwell pressure which has been fed from the injection and dwell pressure setting section 53, is transmitted as a speed instruction value to the injection servomotor by way of a calculator 55 effecting primary delay, an adder 56, a subtracter 57, and a calculator 58 serving as a limiter.

A switch SW1 is inserted and connected between the mold internal pressure sensor 51 and the mold internal pressure setting section 54. The mold internal pressure setting section 54 has a calculation function which will be described later and also has a memory 54-1 for storing a mold internal pressure preset value. The mold internal pressure preset value fed from the memory 54-1 is supplied to the adder 56 by way of a subtracter 59, a calculator 60 for providing a gain, and a switch SW2. The detected value fed from the mold internal pressure sensor 51 is fed to the subtracter 59. As will be described later, the switch SW1 is set ON when setting operation conditions, and the switch SW2 is also set ON during an actual molding process.

In this way, when a measured value from the pressure sensor 52 is fed to the subtracter 57, an injection and dwell pressure feedback control loop is thus formed.

The operation of the control apparatus according to the present embodiment will be described in the following. First, operation condition setting is performed under a condition where both the switch SW1 and the switch SW2 are turned OFF. That is, with respect to the injection and dwell pressure preset value fed from the injection and dwell pressure setting section 53, the measured value from the pressure sensor 52 is fed back, thereby setting operation conditions. Then, when it has become possible to obtain molded products of a good quality, the switch SW1 is turned ON, a detected pattern of the mold internal pressure sensor 51 corresponding to one shot of the molding process (when a molded product having good quality was obtained) is stored as the mold internal pressure preset value in the memory 54-1.

During an actual molding process, the switch SW1 is turned OFF while the switch SW2 is turned ON. At this time, the detected value from the pressure sensor 52 is fed back to the subtracter 57, while the subtracter 59 is operated to calculate the difference between the mold internal pressure preset value stored in the memory 54-1 and the measured value from the mold internal pressure sensor 51. The difference thus calculated is fed to the adder 56 through the calculator 60 and the switch SW2. As a result, the injection and dwell pressure preset value fed from the injection and dwell pressure setting section 53 is adjusted in accordance with the above difference. This means that the injection and swell pressure feedback loop is used to effect mold internal pressure feedback, thereby regulating an instruction value to be fed to the injection servomotor.

In this way, during the actual molding process, when the switch SW1 is turned OFF and the switch SW2 is turned ON, the difference may be calculated between the mold internal pressure preset value stored in the memory 54-1 and the measured mold internal pressure value from the mold internal pressure sensor 51, and the injection and dwell pressure feedback loop may be used as a minor loop to effect mold internal pressure feedback, thereby making it possible to obtain a highly precise and exactly stabilized mold internal pressure capable of producing molded products of a good quality. Therefore, it has become possible to realize an easy setting of the mold internal pressure which would otherwise be difficult to deal with, thereby ensuring a stabilized injection molding process.

Furthermore, the control apparatus of the present embodiment can also be expected to operate in the following examples in the same manner as described. As a first example, various types of measured patterns corresponding to different types of molded products, i.e., various mold internal pressure preset values corresponding to different types of molded products are stored in advance in the memory 54-1 of the mold internal pressure setting section 54. This is because an injection molding machine is required to change its molding conditions from time to time in accordance with different requirements for producing different types of molded products. Accordingly, operation conditions are set in advance for each type of molded product. At this time, each measured pattern (obtained when a molded product of each type having a good quality was obtained) fed from the mold internal pressure sensor 51 is stored in the memory 54-1. Then, when the molded product to be manufactured must be changed from one type to another, a mold internal pressure preset value corresponding to the molded product of the new type is selected and read out from the memory 54-1, so as to be used as the mold internal pressure preset value for carrying out the actual molding process.

As a second example, a plurality of measured patterns (obtained when a molded product of each type of a good quality was obtained) are obtained and the average of the plurality of the measured patterns is stored as mold internal pressure preset values in the memory 54-1. For this reason, the mold internal pressure setting section 54 has a calculation function. That is, the mold internal pressure setting section 54 can operate to sample one measured pattern and to store a sampled value. Subsequently, a calculation is performed in which an average value is calculated from a plurality of sampled values obtained at the same sampling timing with respect to a plurality of detected patterns, thereby calculating, and thus obtaining an average value from a plurality of measured patterns.

Figure 3:
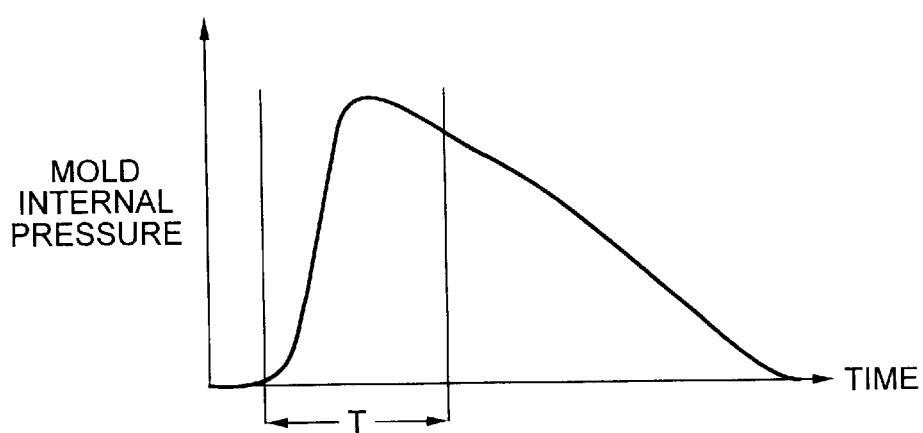
FIG. 3 is a graph showing changes in mold internal pressure during one shot of an injection molding process.

As a third example, the sampling process for obtaining a detected pattern is not carried out during the entire time period for one shot of molding process, but for only during a part of the time period. At this time, for example, a mold internal pressure will change in accordance with the graph shown in FIG. 3. However, the time period during which a fluid resin can maintain its flowability is not covered by the entire time period shown in FIG. 3, but is covered only by the first portion T of the time period. In other words, the above control according to the present invention means that the time period T shown in FIG. 3 will function effectively. Taking the above into account, the above-described sampling process is carried out only in the time period T shown in FIG. 3, while measured patterns obtained in the time period T are stored as mold internal pressure preset value in the memory 54-1. At this time, the calculation for obtaining the difference between the measured pattern stored in the memory 54-1 and the measured value fed from the mold internal pressure sensor 51, is required to be carried out only in the time period T of the above one shot.

In the second embodiment of the present invention, the injection and dwell pressure feedback loop is used to effect an mold internal pressure feedback, thereby making it possible to obtain a highly precise and exactly stable mold internal pressure capable of producing molded products of a good quality. Therefore, it has become possible to realize an easy setting of a mold internal pressure which would otherwise be difficult to control, thereby ensuring a stabilized injection molding process capable of producing molded products having low variation in weight.

What is claimed is:

1. A method for controlling an injection molding machine comprising a nozzle internal resin pressure feedback control system including a mold internal pressure sensor for detecting a mold internal resin pressure as a mold internal pressure detected value, the method comprising:

measuring the mold internal pressure value and feeding the measured mold internal pressure value to the nozzle internal resin pressure feedback control system; providing a nozzle internal pressure preset value in the nozzle internal resin pressure feedback control system; and changing the nozzle internal resin pressure preset value in accordance with a difference between the measured mold internal pressure value and the mold internal pressure preset value.

2. A method for controlling an injection molding machine according to claim 1, wherein the nozzle internal resin pressure feedback control system includes a nozzle internal pressure sensor for measuring a nozzle internal resin pressure as a measured nozzle internal pressure value, so as to control an injection pressure in accordance with the difference between the nozzle internal pressure preset value and the measured nozzle internal pressure value.

3. A method for controlling an injection molding machine according to claim 2, wherein the injection molding machine is a hydraulic injection molding machine, and the nozzle internal resin pressure feedback control system operates to as to control an oil pressure in a hydraulic injection cylinder in accordance with the difference between the nozzle internal pressure preset value and the measured nozzle internal pressure value.

4. A method for controlling an injection molding machine according to claim 2, wherein the injection molding machine is a motor-driven injection molding machine, the nozzle internal resin pressure feedback control system operates to control the position of a screw driven by an injection servomotor, in accordance with the difference between the nozzle internal pressure preset value and the measured internal nozzle pressure value.

5. A method for controlling an injection molding machine by executing a feedback control by the use of a measured pressure value detected by a second pressure sensor and an injection and dwell pressure preset value, the method comprising:

measuring a resin pressure by a mold internal pressure sensor, as a measured mold internal pressure value, for measuring within a metal mold cavity or within a resin flow passage extending to the cavity;

calculating a difference between a mold internal pressure preset value and the measured mold internal pressure value; and executing the feedback control to produce an instruction value for injection and dwell pressure by adjusting the injection and dwell pressure preset value in accordance with the difference;

wherein, with respect to the injection and dwell pressure preset value, the measured pressure value fed from the second pressure sensor is fed back so as to set operation conditions, a measured pattern of the mold internal pressure sensor, obtained when a molded product of a good quality was produced, being stored as the mold internal pressure preset values in a memory.

6. A method for controlling an injection molding machine according to claim 5, wherein (a) a plurality of measured patterns corresponding to different types of molded products are stored in advance in the memory, and (b) in an actual molding process, the plurality of measured patterns are optionally selected.

7. A method for controlling an injection molding machine according to claim 5, wherein (a) a plurality of measured patterns for one type of molded product are obtained by a sampling process, and (b) average values obtained from the plurality of measured patterns are stored as the mold internal pressure preset values in the memory.

8. A method for controlling an injection molding machine according to claim 5, wherein the sampling process for obtaining the measured pattern is performed within a predetermined time period during one shot of molding processing.

9. A method for controlling an injection molding machine according to claim 5, wherein, only within a predetermined time period during one shot of molding processing, the feedback control is executed to produce the instruction value for injection and dwell pressure by adjusting the injection and dwell pressure preset value in accordance with the difference.

10. An apparatus for controlling an injection molding machine, comprising:

a mold internal pressure sensor for measuring a resin pressure within a metal mold cavity or within a resin flow passage extending to the cavity;

a second pressure sensor for measuring an injection and dwell pressure;

an injection and dwell pressure setting section; and a mold internal pressure setting section, wherein:

the mold internal pressure setting section includes a memory;

the injection and dwell pressure setting section includes means for feeding back an injection and dwell pressure preset value and a measured value from the second pressure sensor so as to set operation conditions;

the mold internal pressure setting section also including means for storing, as mold internal pressure preset values in the memory, a measured pattern of the mold internal pressure sensor, obtained when a molded product of a good quality was produced;

the mold internal pressure setting section also including means for feeding back a difference between a mold internal pressure preset value, stored in the memory, and a measured value from the mold internal pressure sensor;

the injection and dwell pressure setting section also including means for adjusting the injection and dwell pressure preset value so that an injection and dwell pressure feedback loop is used to perform mold internal pressure feedback, thereby regulating an instruction value for injection and dwell pressure.

11. An apparatus for controlling an injection molding machine according to claim 10, wherein a plurality of measured patterns corresponding to different types of molded products are stored in advance in the memory and are optionally selectable.

12. An apparatus for controlling an injection molding machine according to claim 10, wherein a plurality of measured patterns for one type of molded product are obtained, and average value obtained from the measured patterns are stored as mold internal pressure preset values in the memory.

13. An apparatus for controlling an injection molding machine according to claim 10, wherein a sampling process for obtaining the measured patterns is performed within a predetermined time period during one shot of molding processing.

14. An apparatus for controlling an injection molding machine according to claim 13, wherein with respect to the injection and dwell pressure preset value fed from the injection and dwell pressure setting section, a difference is fed back between a measured pattern stored in the memory and a measured value fed from the mold internal pressure sensor, said feedback being effected only within a predetermined time period during one shot of molding processing.

* * * * *